United States Patent
Braun

(10) Patent No.: US 11,582,493 B2
(45) Date of Patent: Feb. 14, 2023

(54) METHOD AND SYSTEM FOR DYNAMIC IMAGE CONTENT REPLACEMENT IN A VIDEO STREAM

(71) Applicant: Appario Global Solutions (AGS) AG, Baar (CH)

(72) Inventor: Max Von Braun, Weilheim (DE)

(73) Assignee: Appario Global Solutions (AGS) AG, Baar (CH)

( * ) Notice: Subject to any disclaimer, the term of this patent is extended or adjusted under 35 U.S.C. 154(b) by 0 days.

(21) Appl. No.: 17/262,468

(22) PCT Filed: Jul. 26, 2019

(86) PCT No.: PCT/EP2019/070185
§ 371 (c)(1),
(2) Date: Jan. 22, 2021

(87) PCT Pub. No.: WO2020/021067
PCT Pub. Date: Jan. 30, 2020

(65) Prior Publication Data
US 2021/0227270 A1    Jul. 22, 2021

(30) Foreign Application Priority Data
Jul. 27, 2018   (EP) ..................... 18186201

(51) Int. Cl.
*H04N 7/10*     (2006.01)
*H04N 21/234*   (2011.01)
(Continued)

(52) U.S. Cl.
CPC ....... *H04N 21/23424* (2013.01); *G09F 13/22* (2013.01); *H04N 21/2187* (2013.01);
(Continued)

(58) Field of Classification Search
CPC ........... H04N 21/2723; H04N 21/2187; H04N 21/234345
(Continued)

(56) References Cited

U.S. PATENT DOCUMENTS

2003/0128218 A1   7/2003   Struyk
2009/0102957 A1   4/2009   Phelan
(Continued)

FOREIGN PATENT DOCUMENTS

CN    106412459    2/2017
EP      2383699    4/2012
(Continued)

OTHER PUBLICATIONS

International Search Report for PCT International Patent Application No. PCT/EP2019/070185, dated Oct. 7, 2019, 4 pages.

*Primary Examiner* — Jivka A Rabovianski
(74) *Attorney, Agent, or Firm* — Day Pitney LLP; George N. Chaclas

(57) ABSTRACT

The present invention relates to a method for dynamic image content replacement in a video stream comprising generating a set of key image data (K) comprising a sequence of at least two different key images (K1, K2), periodically displaying said set of key image data (K) on a physical display, generating at least a first original video stream (O1) of a scene which includes said physical display by recording said scene with a camera, wherein said at least one video stream (O1) comprises key video frames (FK1, FK2), captures synchronously with displaying each of said at least two different key images (K1, K2) of said set of key image data (K) on said physical display, generating a mask area (MA) corresponding to an active area of said physical display visible in said key video frames from differential images (AFK) obtained from consecutive key video frames (FK1, FK2), generating at least one alternative video stream (V) by inserting of alternative image content (I) into the mask area
(Continued)

(MA) of an original video stream, and broadcasting at least said at least one alternative video stream.

16 Claims, 3 Drawing Sheets

(51) Int. Cl.
  G09F 13/22  (2006.01)
  H04N 21/2187  (2011.01)
  H04N 21/2343  (2011.01)
  H04N 21/236  (2011.01)
(52) U.S. Cl.
  CPC .............. *H04N 21/23439* (2013.01); *H04N 21/23608* (2013.01); *G09F 2013/222* (2013.01)
(58) Field of Classification Search
  USPC ...................................... 725/32, 34
  See application file for complete search history.

(56) References Cited

U.S. PATENT DOCUMENTS

| 2015/0015743 | A1* | 1/2015 | Rantalainen | H04N 5/272 |
| | | | | 348/239 |
| 2015/0324946 | A1* | 11/2015 | Arce | G06T 5/004 |
| | | | | 382/251 |
| 2016/0255283 | A1 | 9/2016 | Vonolfen et al. | |
| 2018/0020167 | A1 | 1/2018 | Hammond | |

FOREIGN PATENT DOCUMENTS

| EP | 3226565 | 10/2017 |
| WO | 2010/049578 | 5/2010 |
| WO | 2013/0186278 | 12/2013 |
| WO | 2016/023953 | 2/2016 |
| WO | 2018/138367 | 8/2018 |

* cited by examiner

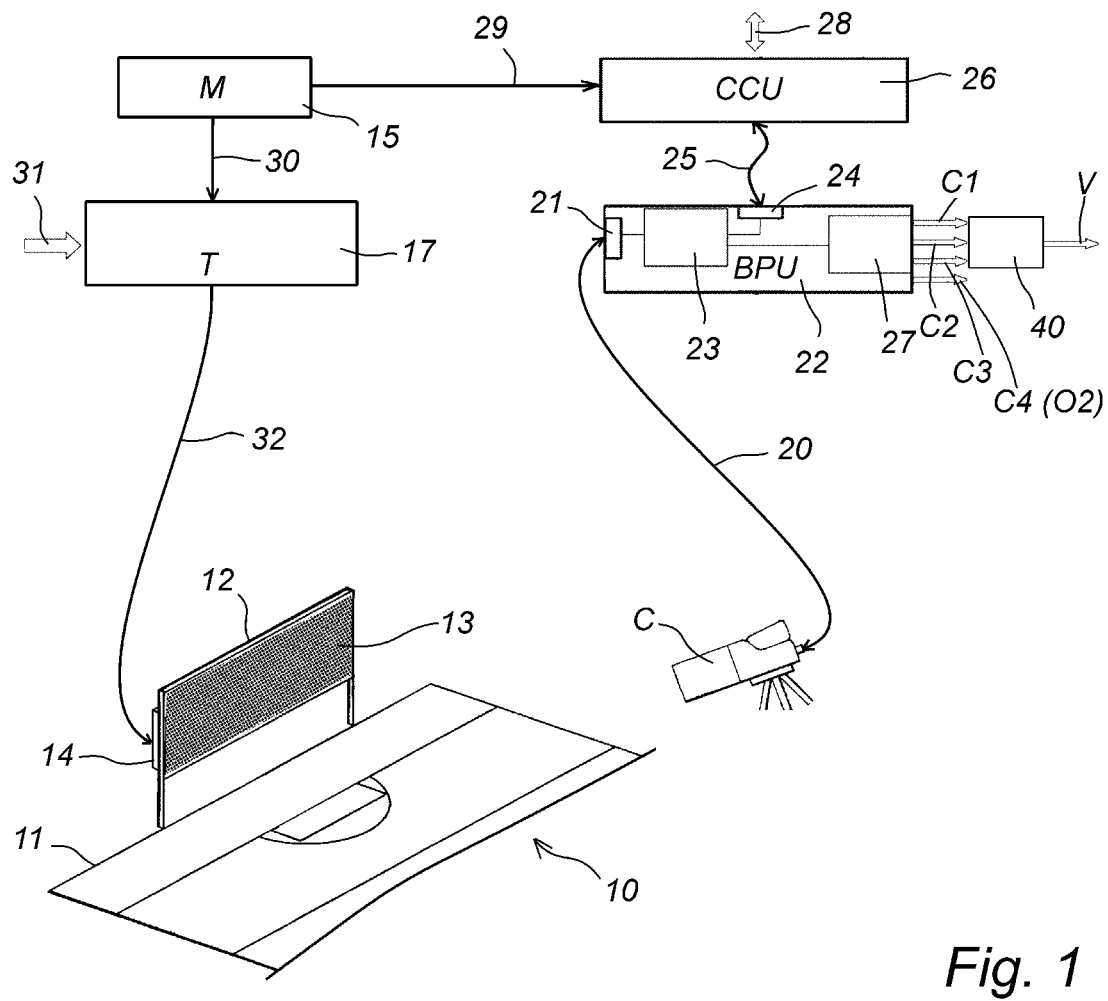
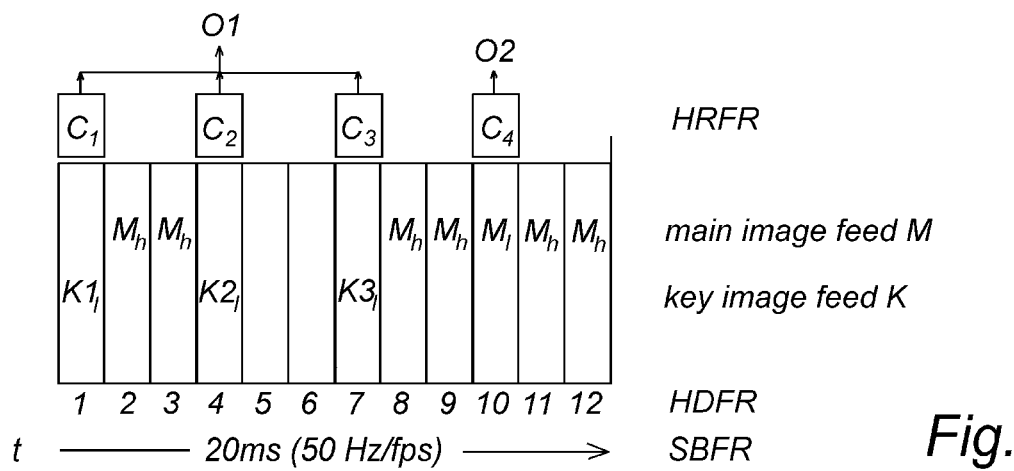
Fig. 2

(a)
FK1
(b)
FK2
(c)
FK3
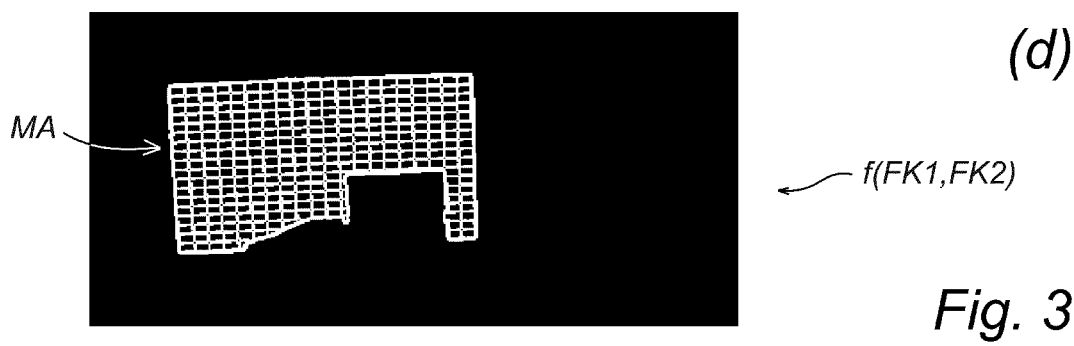
(d)
f(FK1,FK2)
Fig. 3

METHOD AND SYSTEM FOR DYNAMIC IMAGE CONTENT REPLACEMENT IN A VIDEO STREAM

CROSS-REFERENCE TO RELATED APPLICATIONS

This application is the U.S. national phase entry under 35 U.S.C. § 371 of International Application No. PCT/EP2019/070185, filed Jul. 26, 2019, entitled METHOD AND SYSTEM FOR DYNAMIC IMAGE CONTENT REPLACEMENT IN A VIDEO STREAM, which in turn claims priority to and benefit of European Application No. 18186201.2, filed Jul. 27, 2018 of which each is incorporated herein by reference in its entirety for all purposes.

The present invention concerns a method and a system for dynamic image content replacement in a video stream, particularly in a video stream in which an active display such as an LED display is part of the recorded image content.

Active displays, such as Light-Emitting Diode (LED) displays are widely used as billboards or signboards to convey information or advertisements to viewers. Typically, such displays are used in sports or entertainment events. Consequently, such displays often appear in television (TV) broadcasts (TV) or video broadcast delivered via internet streams. These broadcasts are directed to a large variety of different viewers, a typical example being viewers in different countries with different native languages or different cultural backgrounds. In order to target information/advertisements shown on these displays to specific sub-sets of these viewers, methods have already been developed to vary the content of a display between viewers observing the display via a television broadcast or a video stream.

One group of these methods uses software based video processing technology to identify the location of the billboard in each frame of the recorded video stream and to electronically replace the content shown on the billboard in this video stream by one or more alternative contents to generate one or more additional video streams, which may be transmitted to different sub-sets of users. Accordingly, although only one particular type of advertisement is visible at a given time for the direct viewers which are present at the live event, different sub-sets of broadcast viewers can watch video streams of the event at the same given time, where the billboards appearing in these broadcasts show different types of advertisement specifically targeted to the respective broadcast viewer sub-sets.

In order to obtain a photo-realistic impression of the video stream, it is important that the image content of the active displays shown in the video screen are altered in such a manner that the viewer will not notice that an electronic image content replacement has occurred. The most challenging difficulty in dynamic content replacement resides in accurately identifying the location of the active display, such as an LED billboard, in a complex environment and in identifying any distortions affecting the billboard at a given time. Those distortions can be manifold: The most interesting events for dynamic image content replacement will not occur in a well-defined TV studio environment, but at outside events such as live sports events. Accordingly, typical distortions affecting the representation of the active display in the video stream involve perspective distortions due to (possibly dynamically changing) distance, angle or zoom characteristics of the recording camera with respect to the recorded active display. Further, total or partial coverage of the active display by objects, for instance a fast moving football, or people, for instance players, moving in the line of sight between the active display and the recording camera have to be expected. Partial coverage may even involve semi-transparent coverage by small objects, such as rain or fog.

One concept trying to achieve a reliable detection of the active display in a video screen involve non-intrusive methods, i.e. methods which do not interfere with advertisement or recording equipment present conventionally used in live broadcasting events. Such methods are for instance described in EP 2383699 A1. These methods involve extensive additional knowledge of the physical display to be detected, using for instance a computer based 3D model of the display and matching image segments of a video stream to a set of reference silhouettes obtained from the computed base 3D model. Up to date, these concepts fail to provide videos with photo-realistic image replacement, i.e. where the broadcast viewer will not readily notice that the advertisements have electronically been inserted.

Other concepts are intrusive in that dedicated equipment for advertisement billboards and or video recording is required. For instance, in certain methods, characteristic sequences of short monochromatic images are presented on the active display and the camera itself or specialized detectors associated with the camera are configured to detect those monochromatic frames. The area identified by the monochromatic frames is then replaced by the desired alternative image content. However, although the inserted monochromatic frames are short, the viewing experience of the direct viewers may still be disturbed by flash-like effects even when they are not consciously viewed as an image on the active display. WO 2013/186278 A1 describes an improved, where infrared images are used to identify the active display which should due to their wavelength have less disturbing effects on the direct viewers. However, commercially available displays are not intended to provide significant radiation intensity in the infrared range so that the method of WO 2013/186278 A1 does not only require specialized billboards, but also specialized detectors associated with the respective cameras. The detectors are arranged to move with the camera, i.e. to follow the same pan and tilt motion as the camera to provide additional telemetry signals which transmit relevant parameters of the camera such as the focal length, aperture, motion and position to a video processing server in a remote truck or outside broadcast van (OB van) where a content replacement system is located, which uses these parameters to identify the active display and replace its image content by any desired alternative image content. In WO 2016/023953 of the same applicant, it is also suggested to obtain images of the scene at different resolutions in order to enhance representation of fine details obscuring the active display. In any case, sophisticated and specialized equipment is required in the dynamic content replacement method of prior art.

It is therefore an object of the present invention to provide a method and a system for dynamic image content replacement in a video stream, particularly, for replacing image content of an active display visible in the video stream by alternative image content, which is cost effective and easy to implement with commercially available billboard technology and camera technology using software algorithms, which not require excessive processing power.

This technical problem is solved by the method of present claim 1. Preferred embodiments of the claimed method are subject of the dependent claims.

Accordingly, the present invention relates to a method for dynamic image content replacement in a video stream comprising generating a set of key image data (K) comprising a sequence of at least two different key images (K1, K2), periodically displaying said set of key image data (K) on a physical display, generating at least a first original video stream (O1) of a scene which includes said physical display by recording said scene with a camera, wherein said at least one video stream (O1) comprises key video frames (FK1, FK2), captures synchronously with displaying each of said at least two different key images (K1, K2) of said set of key image data (K) on said physical display, generating a mask area (MA) corresponding to an active area of said physical display visible in said key video frames from differential images (ΔFK) obtained from consecutive key video frames (FK1, FK2), generating at least one alternative video stream (V) by inserting of alternative image content (I) into the mask area (MA) of an original video stream, and broadcasting at least said at least one alternative video stream.

By determining the mask area, where image replacement should occur via a differential image obtained from a recorded video stream, existing broadcasting and advertisement technology in event locations such as a football stadium only needs to be modified to the extent that key images have to be inserted in the image feed depicted on the physical display of an advertising billboard. The recording camera has to be synchronized with the presentation of the key images on the physical display. Otherwise, the stadium equipment does not have to be adapted to the method of the present invention, so that the invention can be considered as a mildly intrusive concept. In certain embodiments, the recording camera/cameras has/have to be operated at a higher recording frame rate in order to allow the key images to be distinguished from any additional image which might be presented on the physical display, for instance a main image feed which shows advertisement directed to the direct viewer present in the stadium. However, the specification of a presently available LED billboard allows operation at high display frame rates such as 500 to 1,000 Hz/frames per second (fps) so that key images which are presented in time slots of typically 1-5 ms duration can easily be inserted.

The inserted alternative image content (I) can be any desired content intended to appear in the active display area of the broadcasted alternative video stream (V), for instance alternative advertisement targeted to a specific sub-set of viewers. In this case, a variety of alternative image contents can be provided to generate a plurality of alternative video streams, each broadcast to a different sub-set of viewers. However, such a solution requires considerable broadcasting bandwidths at the event location for broadcasting a plurality of video streams directed to the end-viewers.

Therefore, in a preferred embodiment, the alternative image content (I) inserted into the identified active area of the physical display visible in the recorded video frames is a pre-defined monochromatic image. In this embodiment, the resulting alternative video stream is not transmitted directly to the end-viewer but to intermediate distributers, for example broadcasting companies in different countries, allowing them to insert their desired content for the end-viewer via a well established video-processing technique known as "choma-keying".

In a preferred embodiment, said differential image (ΔFK) is obtained by determining an intensity difference between consecutive key video frames (FK1, FK2), typically on the basis of image pixels. Depending on the required resolution, it is also possible to group neighboring pixels of the TV video frames, for instance 2×2 blocks or 4×4 blocks of pixels before calculating the intensity difference allowing to apply a color noise reduction or an intensity noise reduction.

The differential image (ΔFK) is preferably converted into a grey scale image, alternatively, the key video frames can be converted into grey scale frames before the intensity differences are determined.

In one embodiment, said key images (K1, K2) are different monochromatic images. In one embodiment, one key image can be a white image, homogenously highlighting the active area of the physical display and the other key image is a black image, where the active area of the physical display is not illuminated at all. This allows obtaining a maximum intensity difference between consecutive key video frames allowing it to easily identify the active area of the physical display. However, especially in cases where the intensity difference between the key images (K1) and (K2) is high, reflections of the higher intensity image in between may also be present in the differential image (ΔFK). To avoid reflections of affecting the generated mask area (MA), a threshold can be applied to the intensity difference so that only intensity differences above a certain threshold value are employed for determining the mask area (MA).

From mere monochromatic key images, it is difficult to determine any optical distortions such as perspective distortions affecting the recorded physical display. This problem can be partly mitigated by including prior knowledge of certain geometrical characteristics of the physical display to extract perspective distortions from the generated mask. In a preferred embodiment, however, the key images (K1) and (K2) comprise different image patterns distributed over the active area of the physical display. A preferred pattern is a checkerboard pattern made up from monochromatic squares or rectangles distributed over the active area. In one embodiment, image (K1) is the inverse checkerboard pattern of image (K2). For instance, if image (K1) is made from white/grey and black squares or rectangles, in the image (K2) the white/grey and black squares or rectangles are simply interchanged. Accordingly, in a preferred embodiment, the image pattern of one key frame (K1) is a monochromatic checkerboard pattern and the image pattern of the other key frame (K2) is the corresponding inverse checkerboard pattern.

In a preferred embodiment, edge and border detection algorithms are applied to the differential image, resulting in a mask area (MA) having a rectangular pattern, while avoiding any reflections to occur even without applying a intensity difference threshold.

If the original checkerboard patterns of images (K1) and (K2) were evenly spaced rectangles, any distortions of the physical display with respect to the camera can be inferred from the pattern distribution in the generated mask area (MA), for instance by fitting the crossing points of the mask by (sectional) splines.

If the alternative image content (I) comprises images intended for the end-viewer, the distortion data can already be employed when inserting the alternative image content into the mask area. However, in a preferred embodiment where the alternative image content (I) comprises monochromatic images for subsequent chroma-keying by intermediate distributors, the distortion data can be transmitted together with the alternative video stream (V) to the intermediate distributors where the actual image content intended for the end-viewer is inserted under application of the respective distortion data.

According to a preferred embodiment, if the set of key image data comprises pattern key images (K1) and (K2), it is preferred to include at least one monochromatic image (K3). Preferably, the monochromatic image (K3) is a black image, i.e. providing black active area of the physical display allowing for a more easy identification of small and semi-transparent objects in the foreground of the physical display, such as raindrops or fog. An improved alternative video stream is obtained by adding a weighted overlay of the mask area of the monochromatic image (K3) to the inserted alternative image content. Similar to the handling of distortion data, depending on the nature of the inserted alternative image content, the corrective image data obtained from the monochromatic key image (K3) can be applied at the recording site or transmitted to the intermediate distributors for application during the chroma-keying processing.

In one embodiment, the method of the present invention provides for generating at least a second set of image data comprising image data (M) to be viewed by direct viewers, e.g. spectators present at an event. In one embodiment, these image data (M) can also be recorded by a camera and broadcasted to a different sub-set of viewers, e.g. to broadcast viewers which are intended to watch the advertisements displayed at the live event rather than electronically exchanged alternative advertisement content.

If the second set of image data (M) is also transmitted to broadcast viewers, a corresponding second original video stream (O2) is generated according to the method of the invention.

As the mask area obtained by the method of the present invention applies to the original video stream (O1) of the set of image data (M) intended for direct viewers as well, image frames from the second original video stream (O2) can also be used to generate the one or more alternative video streams (V). This can, for instance be an advantage when the second original video stream (O2) is recorded at a slow motion speed so that the present invention also allows easy image content replacement in slow motion video streams.

Preferably, the physical display is a LED display.

In one embodiment the LED display is a signboard or billboard.

According to a preferred implementation of the method of the invention, the scene to recorded is part of a sports event or an entertainment event.

The present invention is also concerned with a system for dynamic image content replacement in a video stream, comprising: at least one physical display, a control interface for displaying at least a first set of image data on said physical display,
at least one camera unit for generating at least one original video stream of a scene which includes said physical display, wherein said at least one video stream comprises key video frames (FK1, FK2) captured synchronously with displaying each of said at least two different key images (K1, K2) of said first set of key image data (K) on said physical display,
means for generating a mask area (MA) corresponding to an active area of said physical display visible in said key video frames from differential images (ΔFK) obtained from consecutive key video frames (FK1, FK2),
storage means for alternative image content (I);
means for generating at least one alternative video stream (V) by inserting alternative image content (I) into said mask area (MA) of an original video stream (O1); and
means for broadcasting said at least one alternative video stream (V), for example to a sub-set of viewers or to intermediate distributors.

In a preferred embodiment, said control interface (17) is adapted for displaying said first set of image data (K1,K2, K3) and at least a second of image data (M) on said physical display (12, 13) in a time-sliced multiplexed manner.

In the following, a preferred embodiment of the present invention will be described in more detail making reference to the enclosed drawings. In the drawings, FIG. 1 shows a schematic overview of a video recording system which can be used in the method of the present invention;

FIG. 2 shows a scheme for presenting different sets of image data on a physical display in the method of the present invention;

FIG. 3 shows two key video frames and a processed image obtained therefrom according to an embodiment of the method of the present invention.

Figure 4:
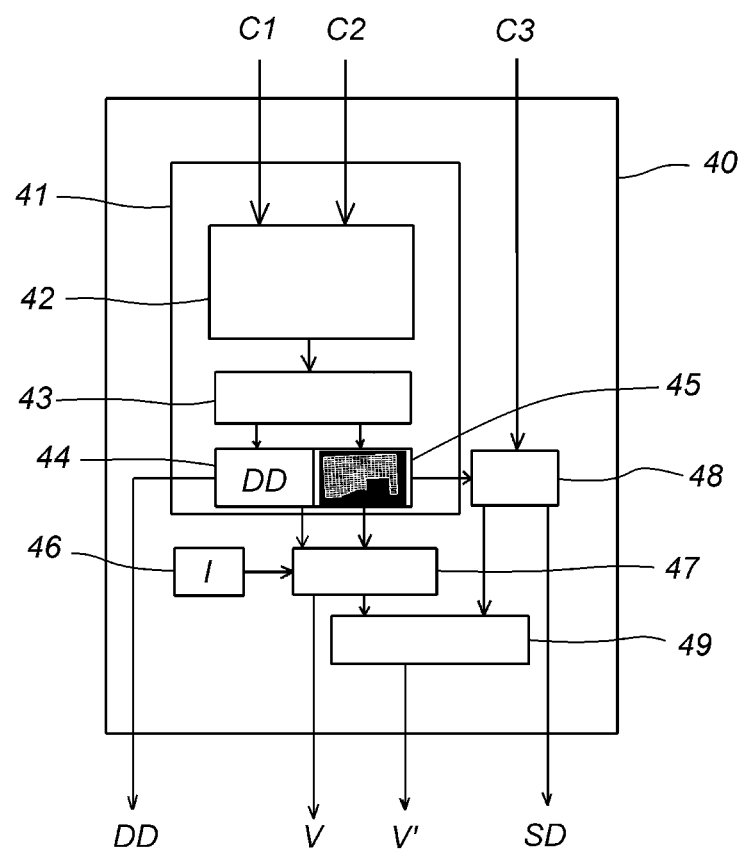
FIG. 4 shows a schematic view of the video processing system for dynamic image content replacement according to the method of the present invention.

The present invention is now described in more detail with reference to a typical example, namely a television broadcast of a sports event.

FIG. 1 show an embodiment a suitable video recording system as described in applicant's PCT/EP2018/052178. In this embodiment, a single camera unit C is used to capture an initial high recording frame rate video stream HRFR of a the scene which includes an LED display 13 of an advertisement billboard 12 arranged at a sideline 11 of a soccer playing filed 10. The advertisement billboard 12 comprises a controller 14 which controls delivery of still and/or animated images to the LED array 13. A typical camera unit C which can be employed in the present embodiment is a HDC 4300 camera commercialized by Sony Corporation which allows recording a scene with a high frame rate. The high recording frame rate video stream HRFR (c.f. FIG. 2) is transmitted via a first optical cable 20 to a first connect 21 of an intermediate processing unit 22. The intermediate processing unit 22 comprises an information bridge 23 to connect the first connect 21 to a second connect 24 which can be used to connect the intermediate processing unit 22 via an second optical cable 25 to a camera control unit (CCU) 26. The camera control unit 26 has additional inputs/outputs 28 for signals such as external camera controls, tally, prompter, return video, etc. A suitable intermediate processing unit 22 is, for instance a baseband process unit (BPU), such as the BPU 4000 commercialized by Sony Corporation. The intermediate processing unit 22 further comprises a video processor 27 for converting and routing the initial high frame rate video stream to a plurality of physical SDI outputs for video streams C1, C2, C3, C4 (c.f. FIG. 2). The video streams C1, C2, C3, etc. can be standard broadcasting frame rate video streams SBFR, having for instance a frame rate of 50 Hz/fps.

The camera unit C receives a master clock signal M from a master clock 17 either directly (not depicted) or via a line 29 connecting the master clock 15 to the camera control unit 26 and optical cables 25, 20.

The master clock signal M is also fed to an interface 17 via line 30. The interface 17 receives image data via image data input 31 and generates trigger signals T according to which the image data are transmitted via line 32 to the LED display 13 where the image data are shown in accordance with the trigger signals T. The trigger signals T are selected such that subsequent frames recorded by the camera unit can show the recorded scene with different image data shown on the LED display 13. As a matter of course, the image data can also be transmitted pre-stored in a storage medium of the display 13 and/or of the interface 17. Moreover, the interface 17 can be part of the advertisement billboard 12 so that line 32 is part of the internal circuitry of billboard 12.

It should be noted, however, that the camera control unit 26 is not essential for the method of the present invention because the camera unit C can employ its dedicated control unit or even have the necessary controls implemented therein. The main purpose of the intermediate processing unit 22 is to split the frames coming from the high frame rate camera unit C into separate video streams at the SDI outputs O1, O2, O3, etc. of the intermediate processing unit 22, as described in more detail below.

FIG. 2 describes a scheme for presenting different sets of image data on the physical display 13 in accordance with an embodiment of the method of the present invention.

For this embodiment, we assume that video feeds are delivered to the viewers of television or internet broadcasts at a standard broadcasting frame rate SBFR of 50 Hz, i.e. 50 frames per second (fps). A scene including a physical LED advertisement display 13 (see FIG. 1) is recorded with a high recording frame rate HRFR (in the present example 200 Hz/fps) by a suitable camera unit C. In this embodiment, the camera is adapted to record scene while on the physical display a first set of key image data K with key images K1, K2, and K3 is presented time-multiplexed with a second set of image data (main set of image data or main feed M) intended for the direct viewers. The key images are recorded in channels C1, C2, C3 which can be multiplexed into a first original video stream O1 for further processing in a downstream video processing unit 40 (c.f. FIG. 1). However, as can be taken from FIG. 1, certain commercially available BPUs already provide SBFR-SDI outputs to which the channels C1, C2, C3 can be routed. These channels can be fed into a video processing unit 40 with requiring multiplexing the channels into an original video feed O1. In the present example, the second original video stream obtained via channel C4 is routed to a further dedicated SDI output where the second original video stream O2 containing the image data of the main feed M is delivered.

In order to enhance the viewing experience of the direct viewers, the physical LED display is operated at high display frame rate HDFR which, in the present example is three times higher than the high recording frame rate HRFR, i.e. 600 Hz.

FIG. 2 depicts a period of 20 ms corresponding to a single periodic time of the standard frame rate 50 Hz/fps. Each periodic time of 20 ms is subdivided into 12 slots of $1/600$ sec duration (i.e. approximately 1.7 ms) representing 12 images displayed on the physical display during a 20 ms period with a HDFR rate of 600 Hz/fps. The images of the main image feed displayed on the physical display within the 20 ms period are usually identical. In the following 20 ms periods (not depicted in FIG. 2) the pattern is repeated but the image content in the feeds usually changes.

As can be taken from FIG. 2, in the depicted 20 ms period, camera C operating at 200 Hz records four images denoted resulting in different video channels C1, C2, C3 and C4, respectively. The shutter time of camera C is adjusted to the time period of the image slots, i.e. shutter time is smaller or equal to $1/600$ sec. (1.7 ms) such that each video frame recorded by camera C corresponds to only one image depicted on the physical display. Camera recording and physical display are synchronized such that recording starts at the beginning of the first slot. In the present embodiment, two sets of image data are displayed. Images of the set of image data M correspond to the main image feed depicted on the physical display and are intended to be consciously viewed by the direct viewers of the scene. The images of key image feed K are used for the image content replacement method of the present invention.

In preferred embodiments, images K1 and K2 are complementary/inverse image of each other, so that the combined images perceived by the direct viewers of each pair K1 and K2, results in an essentially neutral/grey image thus minimizing any disturbing viewing effect on the direct viewers. The viewing experience of the direct viewers can be further enhanced by recording the images intended for the broadcast viewers at a lower intensity denoted by $M_l$, $K1_l$, $K2_l$ and $K3_l$ while non-recorded images are presented at a higher intensity $M_h$.

FIG. 3 shows a typical embodiment of the method of the present invention. FIGS. 3a-3b show consecutive key video frames FK1, FK2, FK3, respectively, each captured synchronously with displaying the images K1, K2 and K3 on an LED screen 13. Key image K1 is a checkerboard pattern of black and white rectangles and key image K2 is the corresponding inverse checkerboard pattern. FIG. 3d shows the mask area MA resulting from a differential image of FK2 and FK1 with further applications of border and edge detecting algorithms on the differential image. As can be taken from FIG. 3c, distortions of the physical display 13 with respect to the camera and foreground object in the sideline between the camera and physical display are easily identified. The alternative image content can then be inserted, taking the distortions and foreground objects into account. The monochromatic (dark) key frame K3 has not yet been used in this example.

A simple routine for obtaining the mask area MA of FIG. 3d from key frames FK1 and FK2 of FIGS. 3a and 3b has been implemented in Scilab programming language as follows:

```
imW=imread("FK1);
imB=imread("FK2);
imD=imsubtract(imW,imB);
imgrey=rgb2gray(imD. *3);
imZ=imsubtract(imB,imW);
imZgray=rgb2gray(imZ. *3);
imAD=imabsdiff(imW,imB);
imADgray=rgb2gray(imAD. *3);
imedge=edge(imADgray.*3,'fftderiv',0.3,6.5);
immaske=imfill(imedge);
imE=immultiply(imgrey,immaske);
imF=immultiply(imZgray,immaske);
imEedge=edge(imE,'fftderiv',0.3,5.);
imFedge=edge(imF,'fftderiv',0.3,5.);
imH=immultiply(imEedge,imFedge);
imI=imadd(imedge,imH);
imshow(imI);
```

As can be taken therefrom, edge detection via FFT derivatives of the absolute difference between the key frames FK1 and FK2 yields the desired contour which is filled to yield the mask immaske.

The pattern of mask area MA is obtained by multiplying the normal differential of FK2 and FK1 and vice versa with the mask and effecting edge detection via FFT derivatives. The two reciprocal results are multiplied to yield the inner area of mask MA which is then added to the contour to yield imI, i.e. the mask area MA as depicted in FIG. 3d.

FIG. 4 shows a schematic embodiment of the video processing unit 40 of FIG. 1 used for the image content replacement method of the present invention in more detail. It should be noted that the operational units described therein can be implemented in hardware or software or both:

Accordingly, channel C1, C2 and C3 are fed into video processing unit 40. The video processing unit 40 comprises a mask area generator 41 which receives input from channel C1 containing key frames FK1 and channel C2 containing key frames FK2. The mask area generator 41 comprises a differential image generator 42 and a distortion evaluator 43 yielding mask area (MA) data storage 44 and a distortion data (DD) storage 45. The distortion data DD can directly be routed to an output of the video processing unit 40. An image data storage 46 contains alternative image data (I) which are inserted into an area of either FK1, FK2 or FK3 frames defined by the mask area MA data in an image replacement unit 47 to yield alternative video stream V.

Channel C3 comprising key frames FK3 which show the display with monochromatic key images K3 are analyzed in the structure evaluation unit 48 using mask area data from mask area storage 45. The resulting structure data SD can directly routed to an output of the video processing unit 40.

If the inserted image data I are monochromic images for chroma-keying processing, video stream V, distortion data DD and structure data SD can be transmitted to external/remote intermediate distributors for further processing before delivery of the alternative video streams to end-viewers.

If the inserted image data I comprise images for end-viewers, a video stream V' for end-viewers comprising distortion data DD and structure data SD can obtained in an overlay unit 49.

The invention claimed is:

1. A method for dynamic image content replacement in a video stream, comprising:
   generating a first set of key image data comprising a sequence of at least two different key images;
   periodically displaying said sequence of said at least two different key images of said first set of key image data on a physical display operated at a high display frame rate, said high display frame rate being higher than a standard broadcasting frame rate;
   generating at least a first original video stream of a scene which includes said physical display by recording said scene with a camera operated at a high recording frame rate, said high recording frame rate being higher than said standard broadcasting frame rate, wherein said first original video stream comprises key video frames captured synchronously with displaying each of said at least two different key images of said first set of key image data on said physical display;
   generating a mask area corresponding to an active area of said physical display visible in said key video frames from differential images obtained from consecutive key video frames;
   generating at least one alternative video stream by inserting alternative image content into said mask area of said first original video stream; and
   broadcasting said at least one alternative video stream at said standard broadcasting frame rate;
   wherein said differential images are obtained by determining an intensity difference between said consecutive key video frames.

2. The method of claim 1, wherein said key images are different monochromatic images.

3. The method of claim 2, wherein said mask is generated by applying a threshold to the intensity difference.

4. The method of claim 1 wherein said key images comprise different image patterns.

5. The method of claim 4, wherein the image pattern of one key frame is a monochromatic checkerboard pattern and the image pattern of the other key frame is the corresponding inverse checkerboard pattern.

6. The method of one of claim 4, wherein said mask is generated by applying edge and border detection algorithms to the differential image.

7. The method of claim 6, wherein optical distortion data of the physical display are determined from said mask.

8. The method of claim 4, wherein said first set of key image data comprises said patterned key images and a monochromatic image.

9. The method of claim 1, wherein a second set of image data is generated comprising image data to be viewed by direct viewers and optionally by broadcast viewers.

10. The method of claim 1, wherein the physical display is a LED display.

11. The method of claim 10, wherein the LED display is a signboard or billboard.

12. The method of claim 11, wherein said scene is part of a sports event or an entertainment event.

13. A system for dynamic image content replacement in a video stream, comprising:
    at least one physical display;
    a control interface for displaying at least a first set of image data on said physical display;
    camera unit for generating at least one original video stream of a scene which includes said physical display, wherein said at least one original video stream comprises key video frames captured synchronously with displaying at least two different key images of said first set of key image data on said physical display;
    a video processing unit comprising:
      a differential image generator for generating differential images obtained from consecutive key video frames, wherein said differential images are obtained by determining an intensity difference between said consecutive key video frames;
      a mask generator to generate a mask area corresponding to an active area of said physical display visible in said key video frames from said differential images;
      an image data storage containing alternative image content said alternative image content inserted into said mask area defined by the mask area generator;
      an image replacement unit for inserting said alternative image content into said mask area of the at least one original video stream to generate at least one alternative video stream; and
      an output for broadcasting said at least one alternative video stream.

14. The system of claim 13, wherein said control interface is adapted for displaying said first set of image data and at least a second of image data on said physical display in a time-sliced multiplexed manner.

15. A method for generating a single video stream, comprising the steps of:
    generating, with an image sensor, a first set of key image data comprising a sequence of at least two different key images;
    periodically displaying said sequence of said at least two different key images of said first set of key image data on a physical display;
    capturing, with the image sensor, a first original video stream of a scene which includes said physical display, wherein said first original video stream comprises key video frames captured synchronously with displaying each of said at least two different key images of said first set of key image data on said physical display;

generating a mask area corresponding to an active area of said physical display visible in said key video frames from differential images obtained from consecutive key video frames; and generating a single alternative video stream by inserting alternative image content into said mask area of the first original video stream.

16. A method as recited in claim 15, wherein the differential images are obtained by determining an intensity difference between said consecutive key video frames.

* * * * *